United States Patent
Jarisch et al.

(10) Patent No.: US 8,509,947 B2
(45) Date of Patent: Aug. 13, 2013

(54) AUTONOMOUS FOOD AND BEVERAGE DISTRIBUTION MACHINE

(75) Inventors: Christian Jarisch, Paudex (CH); Nicola Tomatis, Clarmont (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 885 days.

(21) Appl. No.: 12/523,254

(22) PCT Filed: Jan. 17, 2008

(86) PCT No.: PCT/EP2008/050478
§ 371 (c)(1),
(2), (4) Date: Jul. 15, 2009

(87) PCT Pub. No.: WO2008/087171
PCT Pub. Date: Jul. 24, 2008

(65) Prior Publication Data
US 2010/0100241 A1    Apr. 22, 2010

(30) Foreign Application Priority Data

Jan. 19, 2007    (EP) .................................... 07001146

(51) Int. Cl.
*G06F 17/00*    (2006.01)
(52) U.S. Cl.
USPC .............. 700/233; 700/239; 700/245; 221/96
(58) Field of Classification Search
USPC ............................ 221/96; 700/233, 239, 245
See application file for complete search history.

(56) References Cited

U.S. PATENT DOCUMENTS

| | | | | |
|---|---|---|---|---|
| 4,628,674 A * | 12/1986 | Dougan | ................... | 56/400.04 |
| 4,889,210 A * | 12/1989 | Alcaraz et al. | ................... | 186/38 |
| 5,179,843 A | 1/1993 | Cohausz | ................... | 62/237 |
| 6,116,460 A | 9/2000 | Kim et al. | ................... | 221/96 |
| 6,507,773 B2 * | 1/2003 | Parker et al. | ................... | 700/245 |
| 7,577,498 B2 * | 8/2009 | Jennings et al. | ................... | 700/245 |
| 8,036,775 B2 * | 10/2011 | Matsumoto et al. | ................... | 700/245 |
| 2004/0019406 A1 | 1/2004 | Wang et al. | ................... | 700/231 |
| 2004/0117065 A1 | 6/2004 | Wang et al. | ................... | 700/245 |
| 2004/0143421 A1 | 7/2004 | Wang et al. | ................... | 702/188 |
| 2005/0021182 A1 | 1/2005 | Wang et al. | ................... | 700/245 |
| 2005/0021183 A1 | 1/2005 | Wang et al. | ................... | 700/245 |
| 2005/0021187 A1 | 1/2005 | Wang et al. | ................... | 700/259 |
| 2005/0027400 A1 | 2/2005 | Wang et al. | ................... | 700/259 |
| 2005/0240310 A1 | 10/2005 | Wang et al. | ................... | 700/245 |
| 2006/0037969 A1 | 2/2006 | Jennings et al. | ................... | 222/129.1 |
| 2007/0100498 A1 | 5/2007 | Matsumoto et al. | ................... | 700/245 |

FOREIGN PATENT DOCUMENTS

| | | |
|---|---|---|
| CN | 1202676 A | 12/1998 |
| DE | 29907455 | 1/2000 |
| JP | 2001-300876 A | 10/2001 |

OTHER PUBLICATIONS

European Search Report, EP 07001146, dated Jun. 27, 2007.
International Search Report, PCT/EP2008/050478, dated Jun. 3, 2008.

* cited by examiner

*Primary Examiner* — Timothy Waggoner
(74) *Attorney, Agent, or Firm* — Winston & Strawn LLP

(57) ABSTRACT

The invention proposes an autonomous mobile robotic device in the form of an integrated machine for producing beverages or liquid comestibles.

20 Claims, 16 Drawing Sheets

Cup lift down

Cup lift stop/cup ready
Cup lift up

Working principle of the tray lift with sensors:

Tray lift stop / tray ready

Tray lift down

Tray lift up

Position of the Pocket PC

AUTONOMOUS FOOD AND BEVERAGE DISTRIBUTION MACHINE

FIELD OF THE INVENTION

This application is a 371 filing of International Patent Application PCT/EP2008/050478 filed Jan. 17, 2008.

The framework of the present invention is the production of beverages or liquid comestibles on the basis of a liquid such as e.g. water or milk and ingredients.

SUMMARY OF THE INVENTION

It is thereby the object of the present invention to propose a technology offering the production of such products in an appealing manner.

The invention proposes a fully autonomous and preferably completely embedded mobile coffee machine with one or more user interfaces.

The invention proposes an autonomous mobile robotic device, comprising an integrated machine for producing beverages or liquid comestibles.

The device can comprise a controller for the production machine, the controller being connected to a wireless interface designed for receiving wirelessly transmitted signals able to set the operation of the production machine.

The device can comprise a controller for the production machine, the controller being connected to a manually operated user interface for setting the operation of the production machine.

The user interface can be disconnected from the robot in order to enter parameters offboard.

The device can be equipped with an autonomous navigation system designed for navigating the robot based on output signals of e.g. visual sensors of the robot.

The production machine can be self-containing.

The device can comprise an independent electrical power supply.

The production machine can be designed for producing the beverage or liquid comestible based on preportioned ingredients.

The device can have a container for a stock of preportioned ingredients portions.

The device can comprise automatic cup and tray handling system.

The device can comprise a cup storage lift, a cup prehensor (cup manipulator) and a tray storage lift, able to stock several trays, whereas a cup can be transferred from the cup storage lift to the upper tray, in order to move the cup under the coffee outlet for coffee preparation.

The invention also proposes a web based user interface for such a device, being designed for a selection of a coffee blend, a serving place and a serving time/date, using graphical presentation.

The invention also proposes an onboard interface for such a device, designed for ordering of a coffee directly on the robot, using graphical presentation.

BRIEF DESCRIPTION OF THE DRAWINGS

Further object, features and advantages of the invention will become evident by the following detailed description of embodiments of the invention, taken in conjunction with the figures of the enclosed drawings.

DETAILED DESCRIPTION OF THE INVENTION

Figure 2:
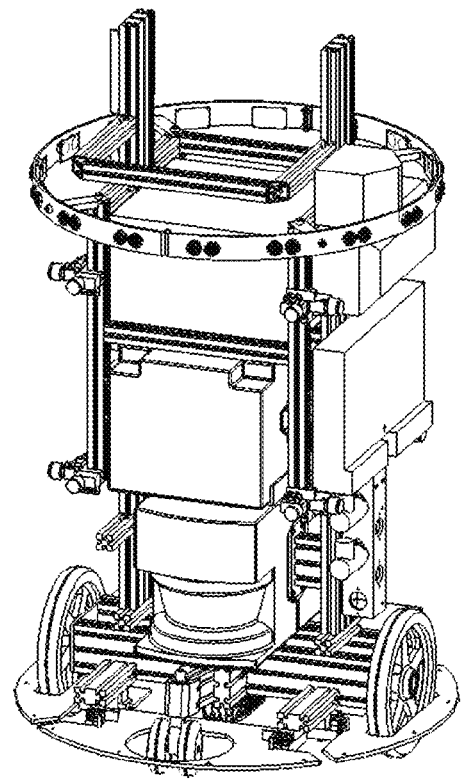
FIG. 2 shoes the mobile base of the robot with integrated PC, sensors, batteries and driving means.
Figure 16:
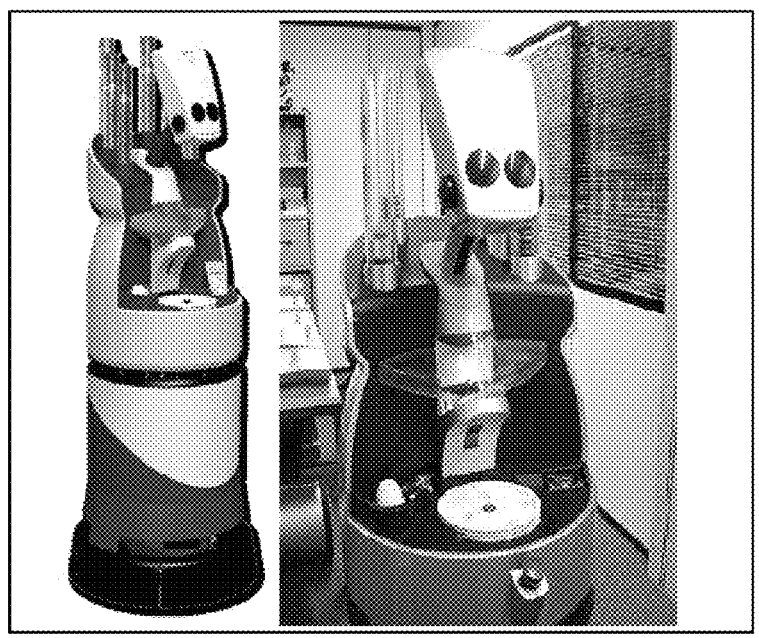
FIG. 16 shows the overall robotic device.

The device according to the present invention is first of all a robot having the overall appearance as shown in FIG. 16. It can comprise two main parts: The fully autonomous mobile base as shown in FIG. 2 and an automatic self-contained beverage (e.g. coffee production) machine, i.e. the robot carries its own resources such as electrical power, ingredients, liquid and computing power.

Figure 1:
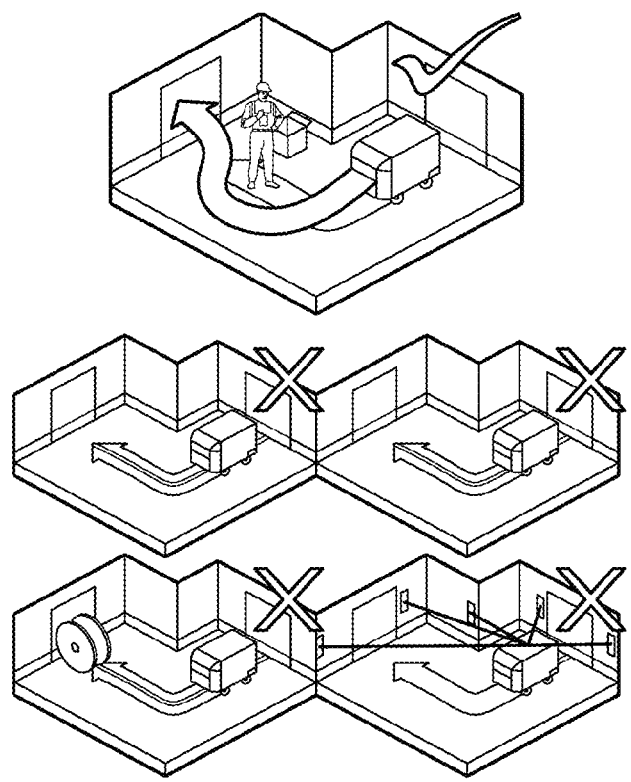
FIG. 1 shows an application scenario for the present invention.

While autonomous guided vehicles (AGVs) usually employ for their navigation expensive and inflexible environment modifications such as floor tracks or reflectors as beacons, nowadays localization approaches are ready for unmodified environments, i.e. natural features. In fact the device according to the invention can be equipped with e.g. visual sensors (cameras etc.), in order to recognize its environment based on a pattern recognition of the output signals of the sensors. The environment of the robot can be previously programmed and stored in a memory of the onboard PC. The device according to the invention can thus act in an application scenario as shown in FIG. 1.

The following description is separated in four parts:
1. Robot and its navigation system (mobile base of the robot)
2. Coffee machine working autonomously regarding the electrical power supply (i.e. no power cables)
3. Cup handling and delivery system
4. User Interface(s)

1. Robot (Mobile Base)

The mobile Base shown in FIG. 2 can be a differential drive system running e.g. the Bluebotics autonomous navigation technology (ANT®) (see bluebotics.com for further details), being one example for an autonomous navigation system.

Figure 20:
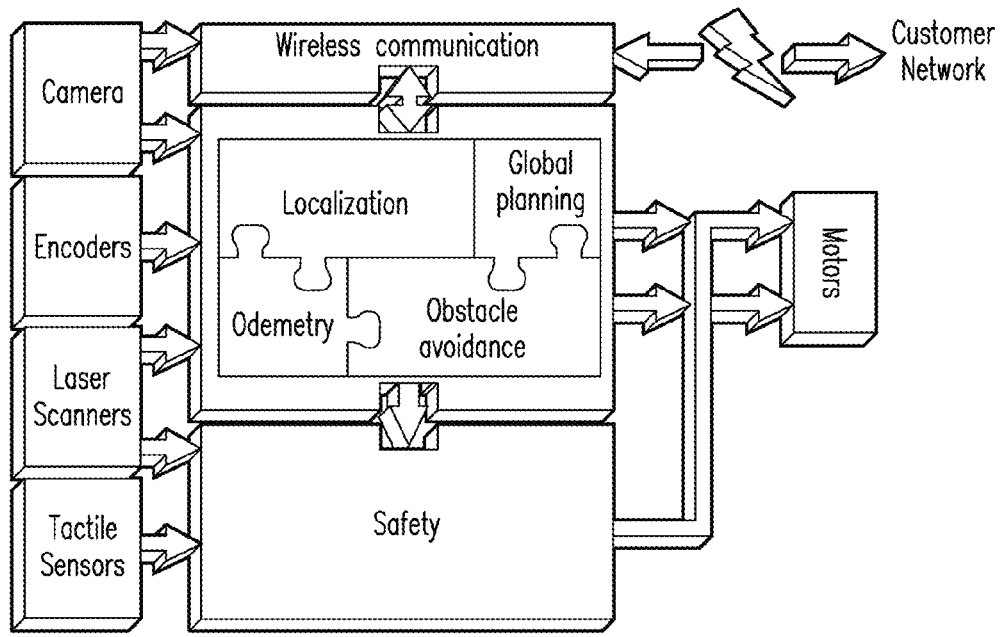
FIG. 20 shows an overview of the navigation system.

The ANT technology will now be explained with reference to FIG. 20. The navigation is presented in three parts: Map; Planning and Motion; and Localization.

The map of the environment is a graph-like structure with nodes, points of interest the robot has to reach in order to perform a certain task. This graph is therefore used for path-planning. Furthermore it contains the information about all the features in the environment. This permits to calculate which feature is visible from the current position of the robot and to use it for localization.

Path Planning and Motion

ANT® implements three path planning algorithms. They work on different levels of abstraction and take sensor readings into account in varying degrees. The topmost layer is the graph-based global planner. It is based on the above mentioned graph structure where nodes are locations of interest and edges denote traversability between locations. The planner employs a depth-first search generating a lengthoptimal path. Since the path is global and no sensor readings are taken into account, dynamic path modification cannot be treated on this level. The second layer of path planning uses a navigation function in a local grid around the robot. It can thus take into account the current sensor readings and is not limited to nodes of the a-priori map. However, the paths have a very poor geometry, consisting of linear segments that lie on angles which are multiples of 45° and they have the tendency to graze obstacles. Smoothing the path and adapting it to dynamic surroundings is done in the third layer of path planning. It is based on the elastic band. The initial plan evolves toward a smoother curve (a list of via points) as long as the elastic band does not "snap". In case dynamic obstacles move in such a way that the minimum clearance along the path cannot be maintained, or if the path lengthens beyond a reasonable amount, the program is called upon again to re-initialize the path.

The motion is under control of the real-time obstacle avoidance task, which is based on the dynamic window method permitting taking into account the actuator limits of the robot (speed which could result in later collisions are not allowed, motion commands never exceed the robot's speed or acceleration limits). Furthermore, the dynamic window takes into account the "exact" robot shape as represented by a convex polygon.

Instead of using the distance traveled before hitting an obstacle, the time until collision is used. This solves a singularity when the robot is turning on the spot (any collisions would seem instantaneous because the distance traveled seems zero). It also means the robot will choose more clearance when traveling at higher speeds.

The objective functions for speed, heading, and clearance are calculated on the actuator phase space. Actuator limits are thus more directly taken into account.

Localization

This method is a global feature-based multi-hypothesis localization using the Kalman filter as estimation framework. It overcomes limitations of the single-hypothesis Kalman filter, since the data association problem is explicitly addressed. The robot preserves the typical advantages of feature-based approaches, such as very high localization accuracy and an efficient implementation and adds an important feature in the case the robot looses the track of its position: It can generates hypotheses about its current position and therefore relocate itself.

The technique which provides this property is a constrained-based search in an interpretation tree. This tree is spanned by all possible local-to-global associations, given a local map of observed features and a global map of model features. The same search is consistently employed for hypothesis generation and pose tracking.

Embedded Automatic Coffee Machine

The embedded automatic coffee machine has to fulfil some specific technical rules in order work as an autonomous coffee machine. Issues like limited power consumption, fully automatic capsule handling with different blends, management of cups and trays had to be resolved.

The coffee machine is composed of three subassemblies:

The capsule storage and dispensing system, the coffee brewing system with hot water storage, pump system and extraction unit, and finally, the cup and tray system, allowing a fully automatic coffee preparation process onboard.

The mobile base is capable of moving, using its own active motion system (such as e.g. wheels driven by a electric motor of the robot) in a defined environment, taking into account moving objects like e.g. human beings. Preferably no physical guiding elements (lines, beacons etc.) are necessary, as the mobile base preferably but not necessarily is self-orienting according to real obstacles detected by its sensors (cameras, laser, tactile sensors etc.) and compared to a pre-programmed map, corresponding to the working environment. The map can be programmed by the robot base itself by using its sensors.

The mobile base contains the batteries for power supply, as well as the controller (control PC etc.) and communication means for the whole robot.

2. Autonomous Coffee Machine

Figure 3:
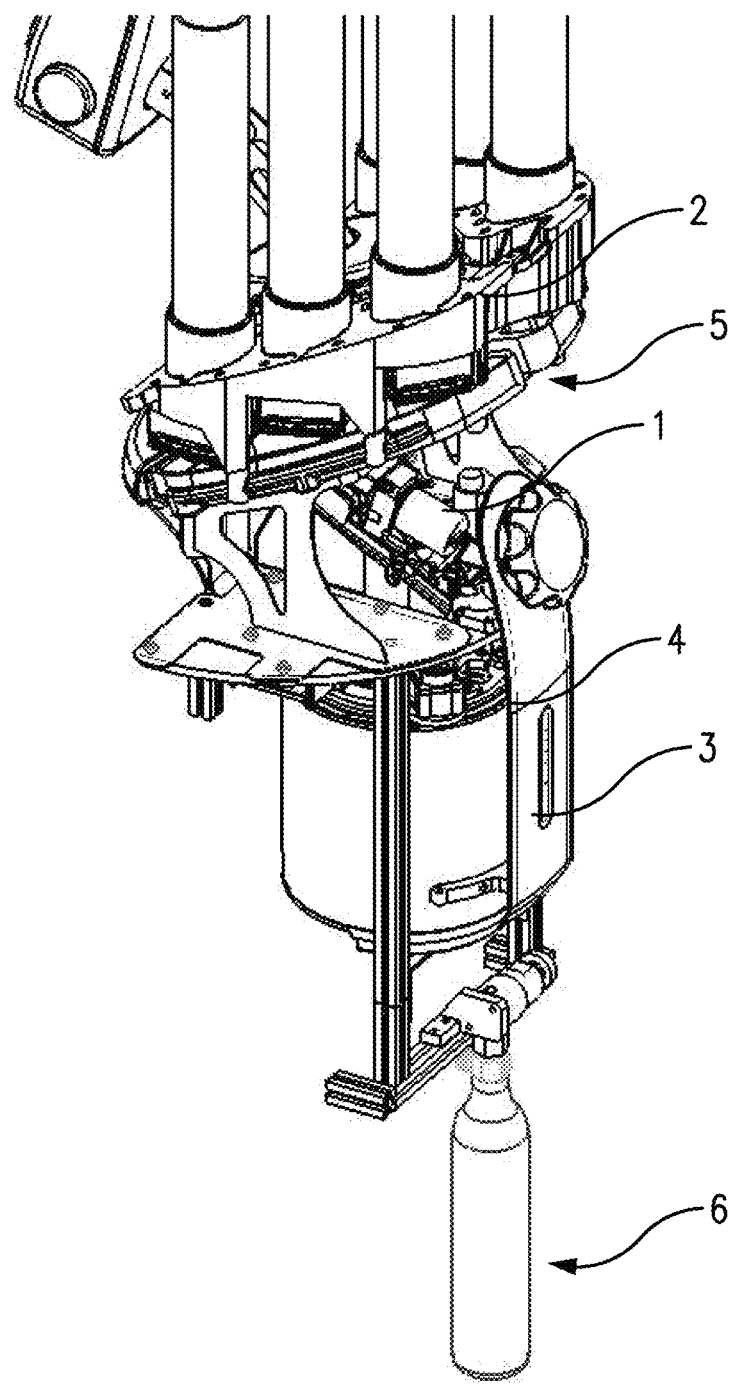
FIG. 3 shows the gas bottle for pressure generation in peristaltic pump, pushing the hot water out of the thermos, going through a flowmeter and into the motorized brewing unit.

The coffee machine integrated in the robot can use the gas technology, i.e. the production of beverages using a pressurized gas acting on a liquid reservoir 3, shown in FIG. 3.

FIG. 1 shows a brewing unit 1 as well as a capsule dispensing mechanism 2. The capsules represent one possibility to use preportioned ingredients. Other preportionings such as tea bags, pouches etc. can be used as well. Alternatively the portioning is carried out by the robot itself.

The coffee machine comprises the following parts:

A thermos watertank 3 including a peristaltic pump and active heating, allowing the water in the thermos to be kept at correct extraction temperature without major energy supply. The heater can work on power cord (heating up), and then becomes independent from cord, using a battery heating (keep warm).

The gas bottle 6 is used for pressure generation in peristaltic pump, pushing the hot water out of the thermos watertank 3, going through a flowmeter 4 and into the motorized brewing unit 1.

Figure 4:
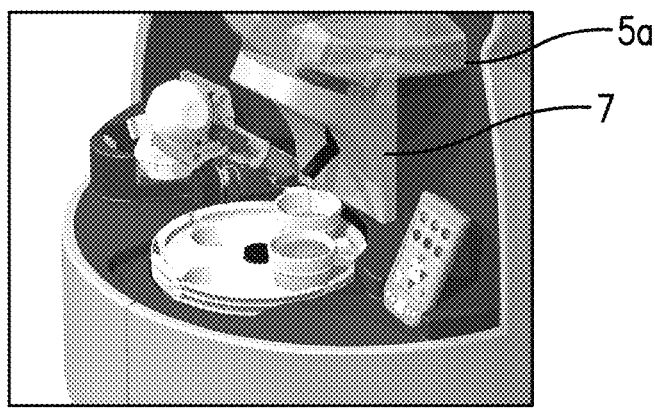
FIG. 4 shows the coffee outlet system.
Figure 4:
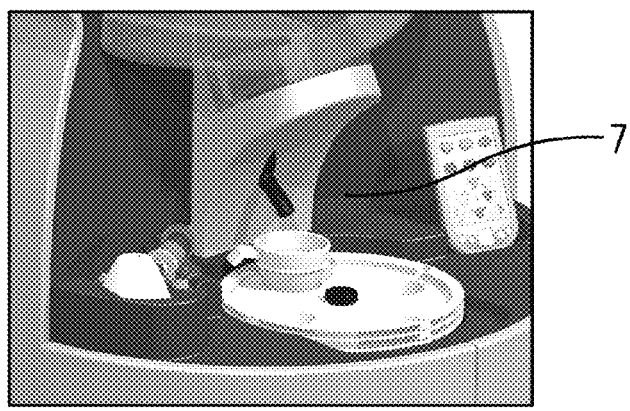
Figure 4:
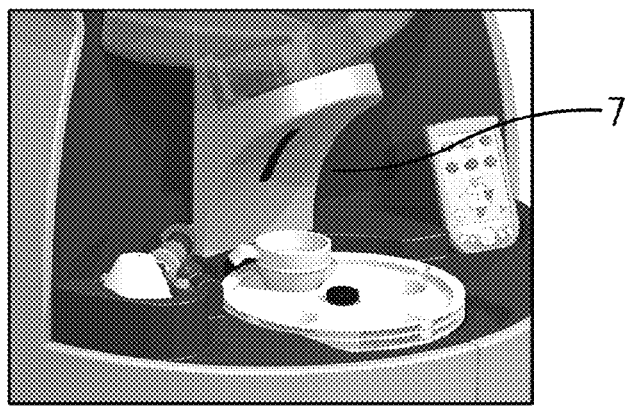
Figure 5:
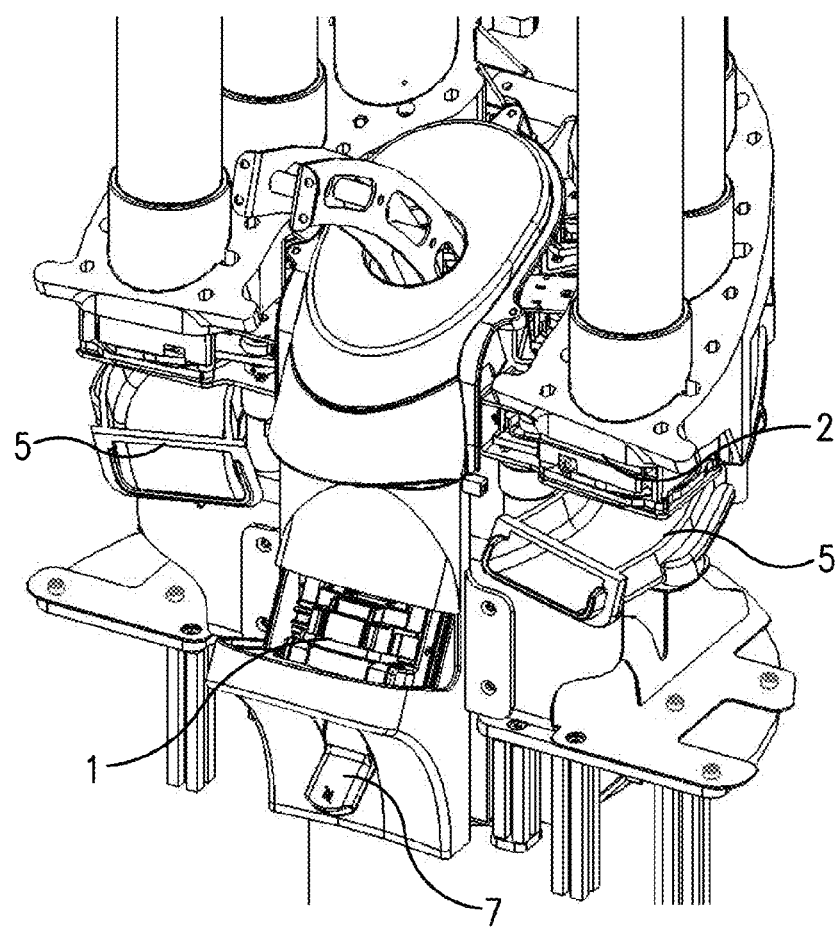
FIG. 5 shows the capsule storage system.
Figure 6:
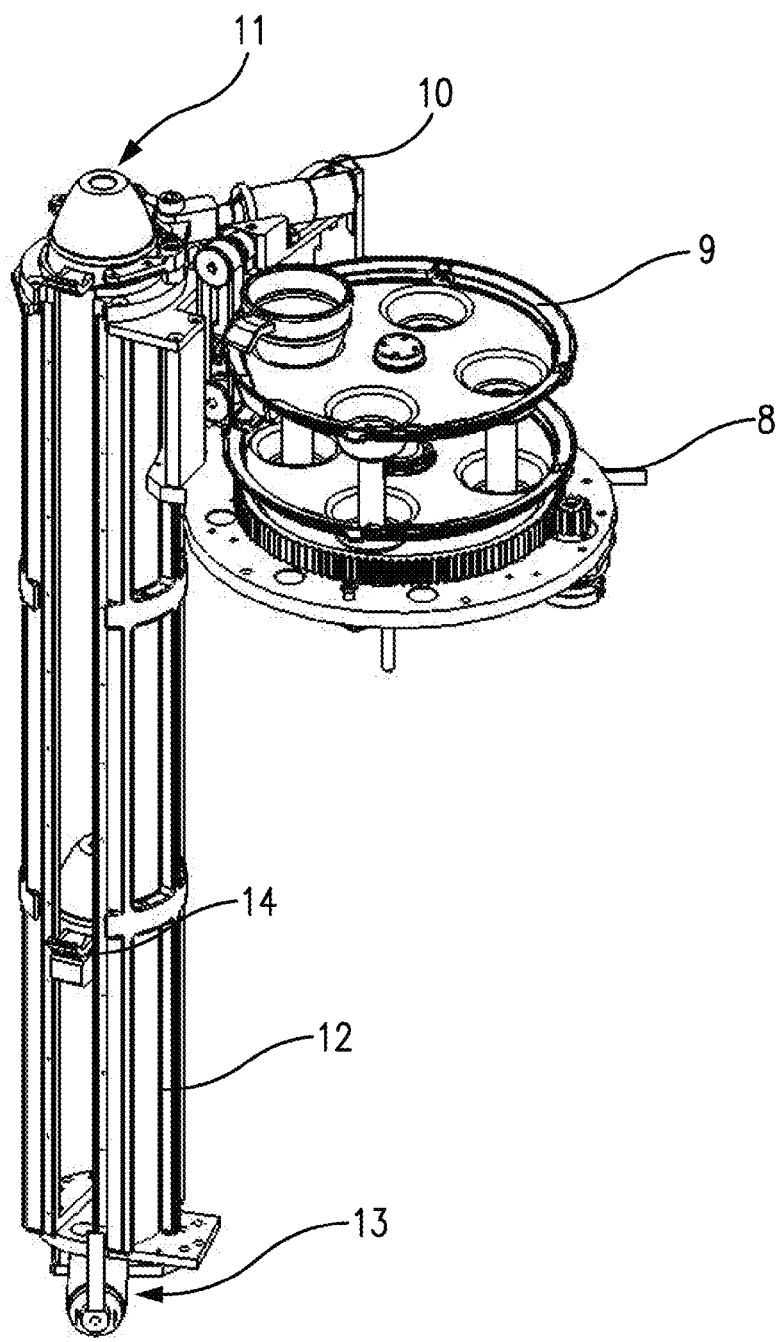
FIG. 6 shows the cup handling and delivery system.
Figure 7:
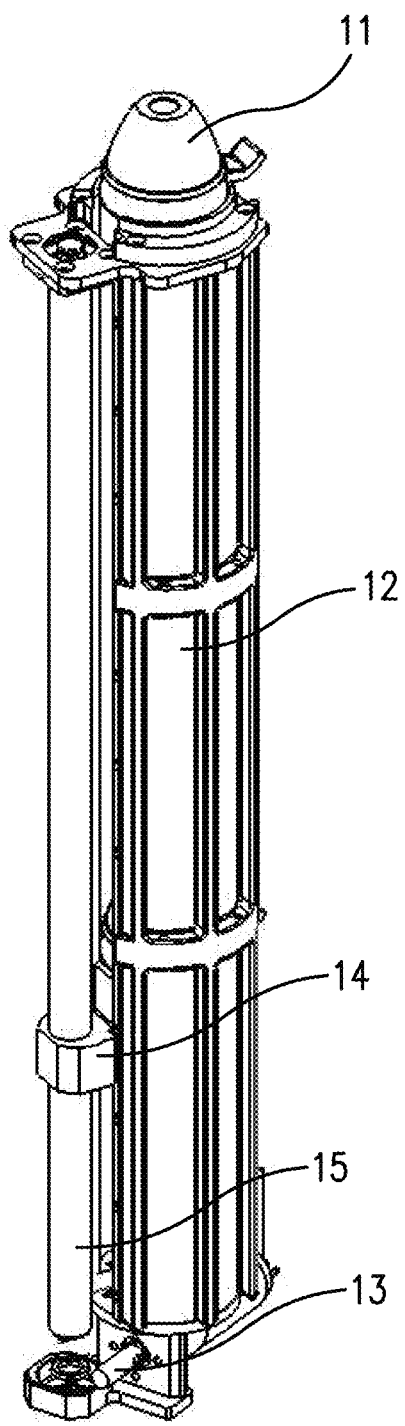
FIGS. 7 and 8 show details of the cup handling and delivery system.
Figure 8:
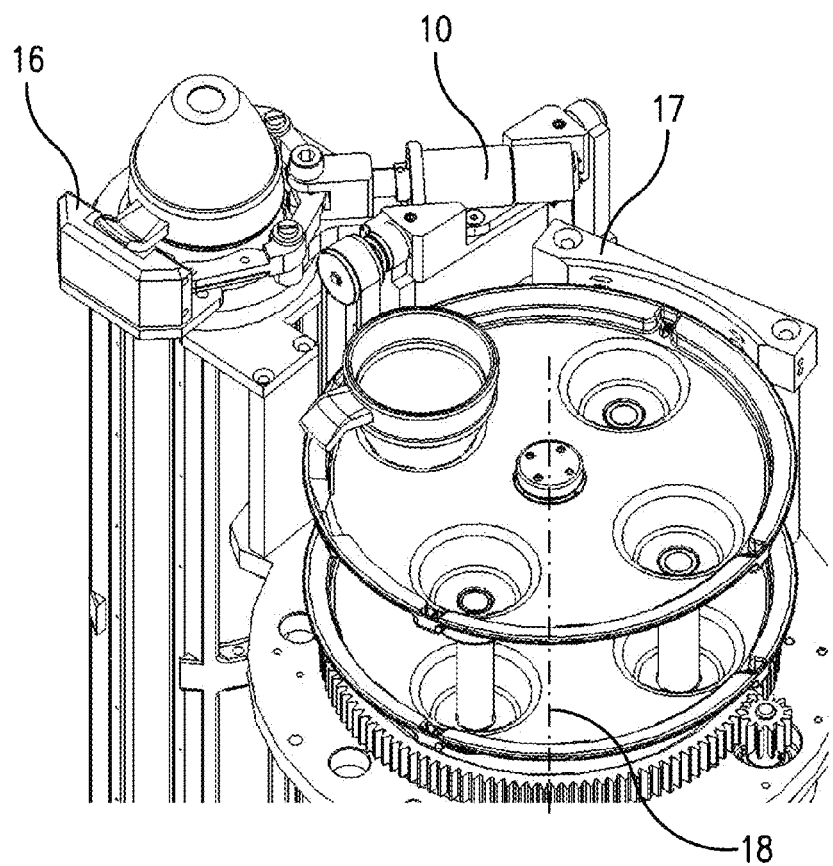
Figure 9:
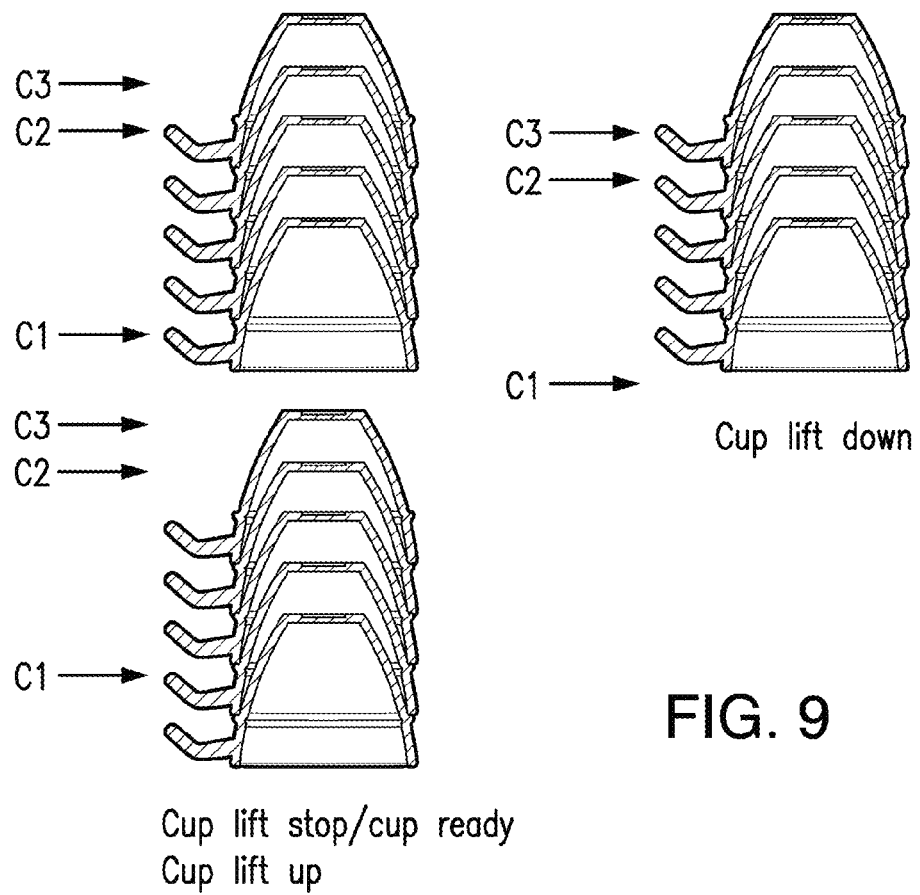
FIG. 9 illustrates the cup lift operation.
Figure 10:
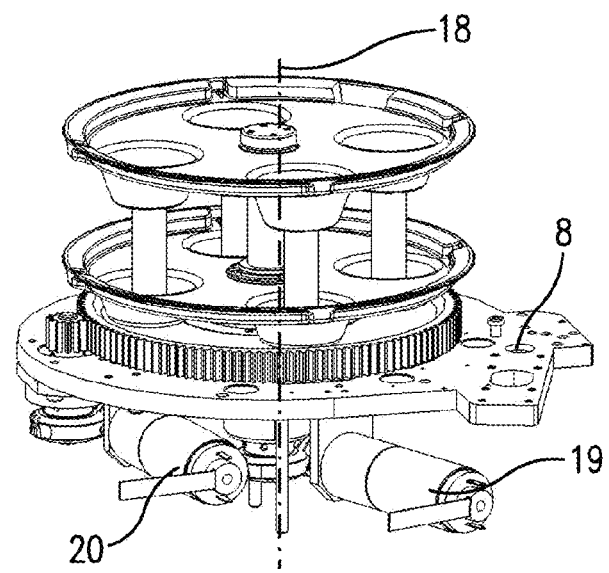
FIGS. 10 to 13 illustrate a cup tray system with tray lift.
Figure 11:
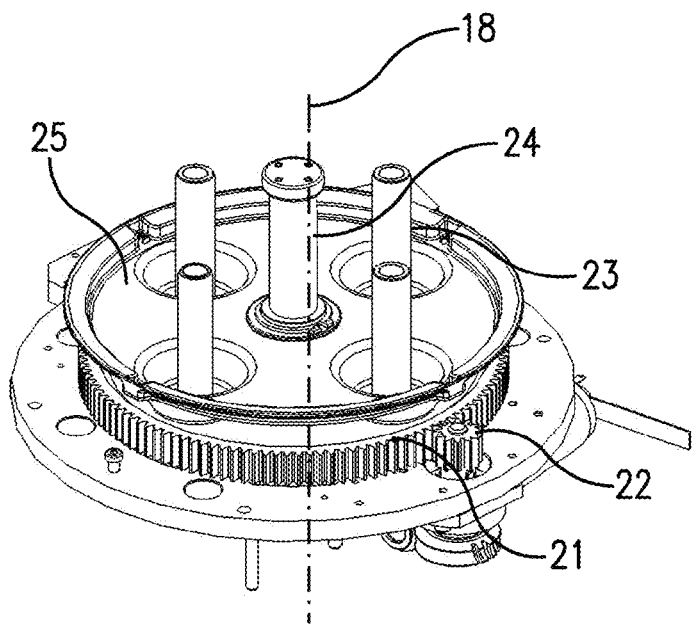
Figure 12:
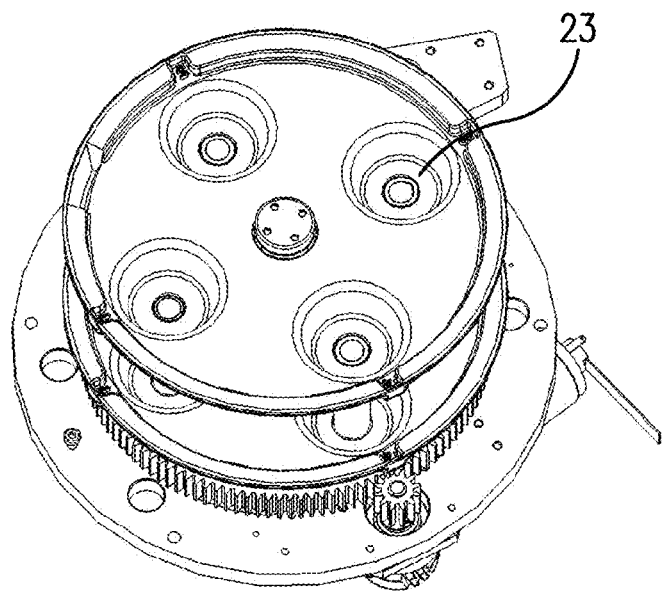
Figure 13:
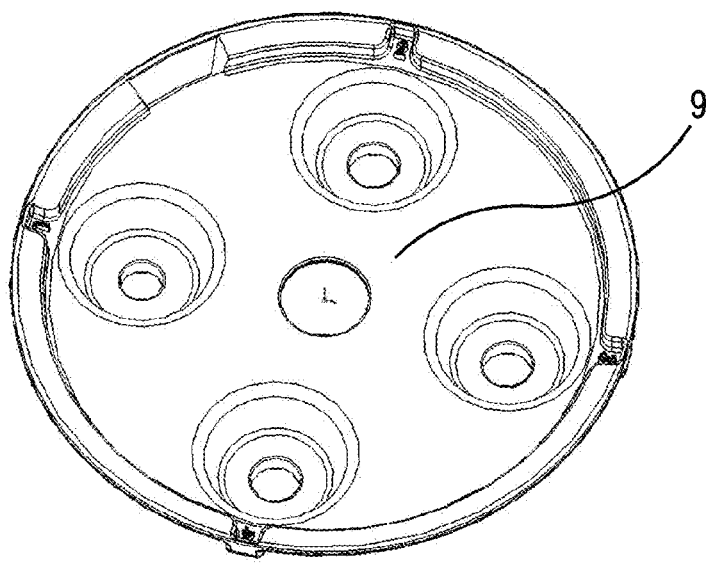

A coffee outlet system 7 (see FIG. 4) with antidrip function by closing the outlet 7 into a vertical position when not dispensing coffee. The remaining coffee in the outlet is emptied through a second tube into the used capsule tray A capsule storage system (e.g. several storage tubes) with its dispensing mechanism 2, symmetrically disposed over two capsule ramps 5, allowing the capsules to glide down over a central ramp 5a into the brewing unit 1 after having released a capsule at one of the several dispensing mechanisms 2.

In the beverage production unit 1 hot water under pressure ins injected into the interior of the capsule in order to interact with ingredients contained in the capsule. (Generally in the brewing unit 1a liquid is brought in contact with ingredients which are preferably provided in preportioned packages.)

After extraction, the capsule is ejected into a used capsule tray.

3. Cup Handling and Delivery System (FIGS. 6 to 15):

The Robot contains an independent cup handling system, comprising:

a cup storage tube 12 with auto-regulating the cups in order to have always the upper cup 11 ready to be captured by a prehensor (cup manipulator) 10. Furthermore, using sensors 16, 17, the storage tube can accept fresh cups and autoregulate the cup lift 14.

In fact, the cup lift is made by a motor driven 13 spindle 15 which moves a cup holder 14 along the vertical direction. The sensors 16, 17 autoregulate the position of cups in order the cup 11 to always be ready to be picked by the prehensor 10 and put on the tray 9. The sensors 16, 17 work according to the principle shown in FIG. 9, whereas two sensors 16, 17 are placed on the top of the cup lift and one sensor is placed at the bottom of the lift.

Figure 14:
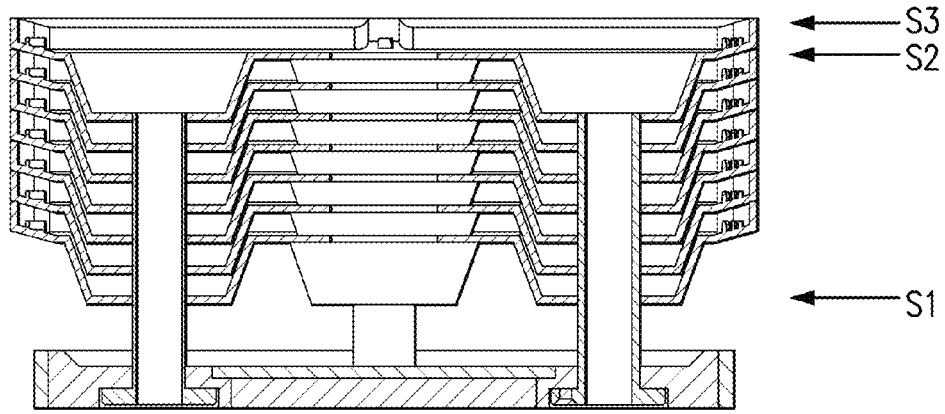
FIG. 14 illustrates the operation of the tray lift.
Figure 14:
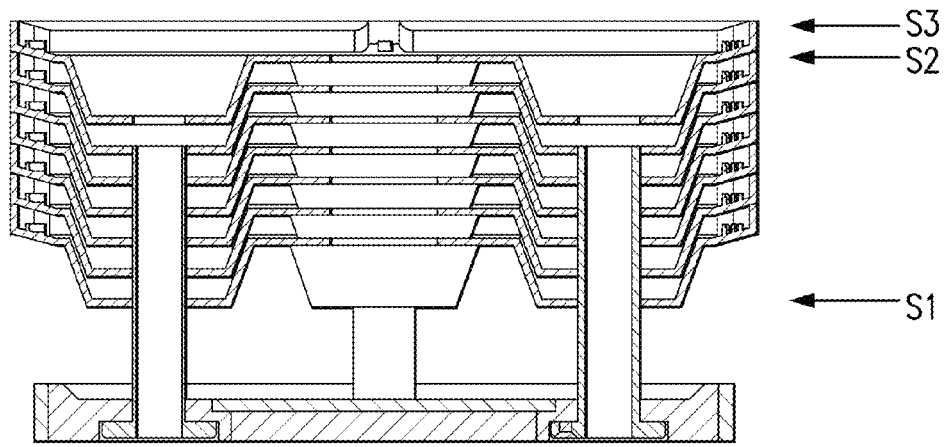
Figure 14:
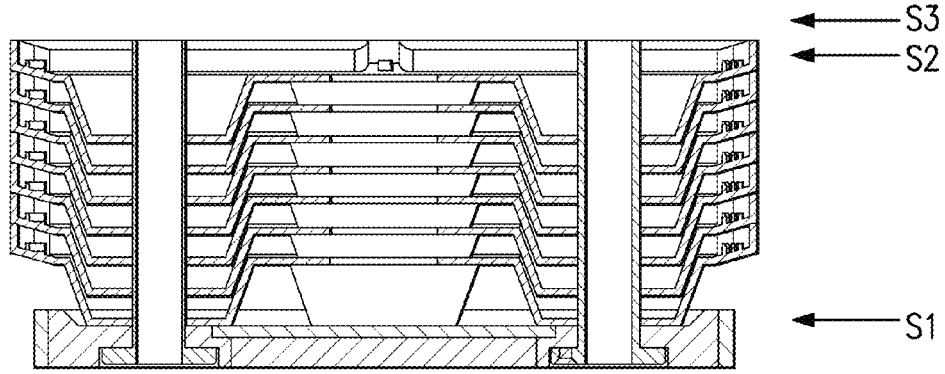
Figure 15:
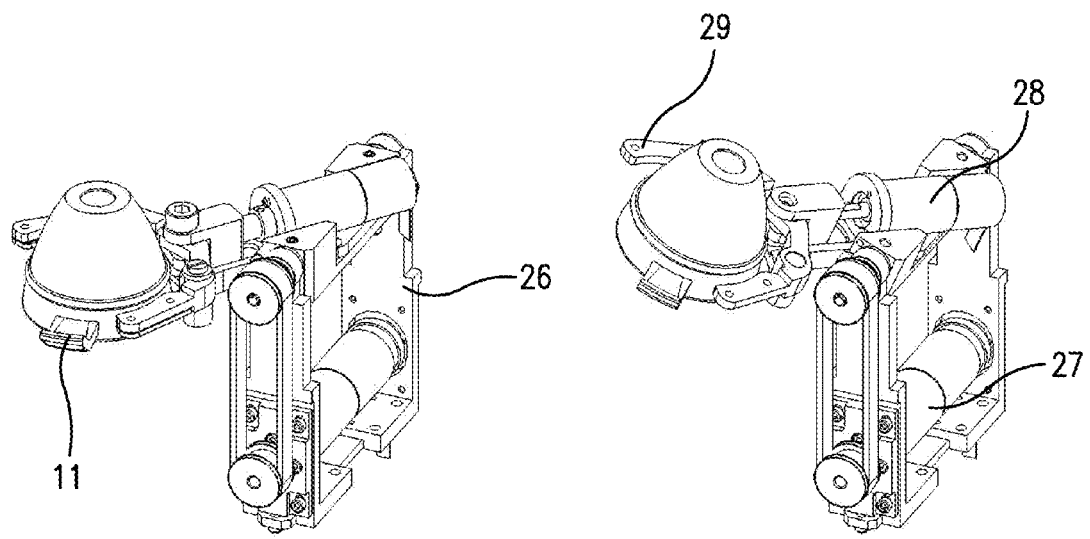
FIG. 15 shows a cup prehensor.

Cup tray system with autoregulating the trays 9 in order to have the upper tray always ready to get fresh cups, working according to the principle shown in FIG. 14 and including sensors 17. The four tubes 23 on each cup position on the tray allow to detect the presence of a cup on the tray by containing optical sensors. Several trays can be stacked on a tray lift in order to take them away for serving coffee at a table and allowing the robot to put the next four cups on the following tray, which moves up to the correct position, once the full tray has been removed from the robot. The tray lift works according to the same principle than the cup lift. Furthermore the tray system consists of a fixed chassis 8, holding trays mounted on a carousel 21, allowing to move the cup to be moved under the coffee outlet 7. The rotation of the tray is made by a motor 20 and two corresponding gears 21, 22 around the axis 18. The vertical moving of the trays is made by a second motor 19 and a central spindle 24. By blocking the tray rotation relatively to the carousel 21 thanks to the four cup detecting tubes 23, the trays can be lifted up and down.

The trays 9 have numbered positions in order to identify the coffee blend served. Furthermore the tray carousel is indexed in order to know which coffee is served in which cup.

A cup prehensor (see particularly FIG. 15) for transferring a cup from the cup storage tube onto the cup tray The cup prehensor comprises a chassis 26 and two motors, one 27 allowing the positioning of a cup onto a tray, one 28 the prehensing of a cup 11 ready in the cup storage lift.

General Functional Description

The process of coffee ordering can be described as following:

1. Receiving of a coffee order using one of the interface explained below.
2. A Cup is put on tray by the prehensor. The cup lift moves up next cup. The prehensor moves back in standby position over cup.
3. Release of the desired capsule, which is gliding into the brewing head
4. The cup tray is turning 90° in order to put the cup under coffee outlet
5. The coffee outlet is opening and brewing head closing.
6. Extraction of coffee
7. Coffee outlet is closing and brewing head opening, ejecting the extracted capsule into a capsule tray.
8. Cup is ready to be taken away by user, or alternatively the whole tray, tray lift moves up next tray.

4. User Interface

The user interface(s) is/are one of the elements of the system. There can be in fact at least two different interfaces:

The first one is relying on a air interface of the robot connected to a controller of the robot. Using the air interface, e.g. a web-based application can permit the ordering from any remote web browser in a secured intranet network. Alternatively the air interface of the robot can be designed for any speech or data (such as e.g. text messages) based wireless communication.

The second interface relies on a detachable manually controlled user interface, such as e.g. a pocket PC, a PDA, a remote control, which can be placed and connected on the robot. The detachable user interface can be used directly on the device according to the present invention (onboard) to choose the coffee blends, or it can be detached and used off-board allowing the users choosing their blends for example around a conference table.

The tow ordering systems can be designated as Remote Ordering (Intranet) and Direct Ordering (Pocket PC) onboard robot or offboard robot (conference room)

Figures 1, 17:
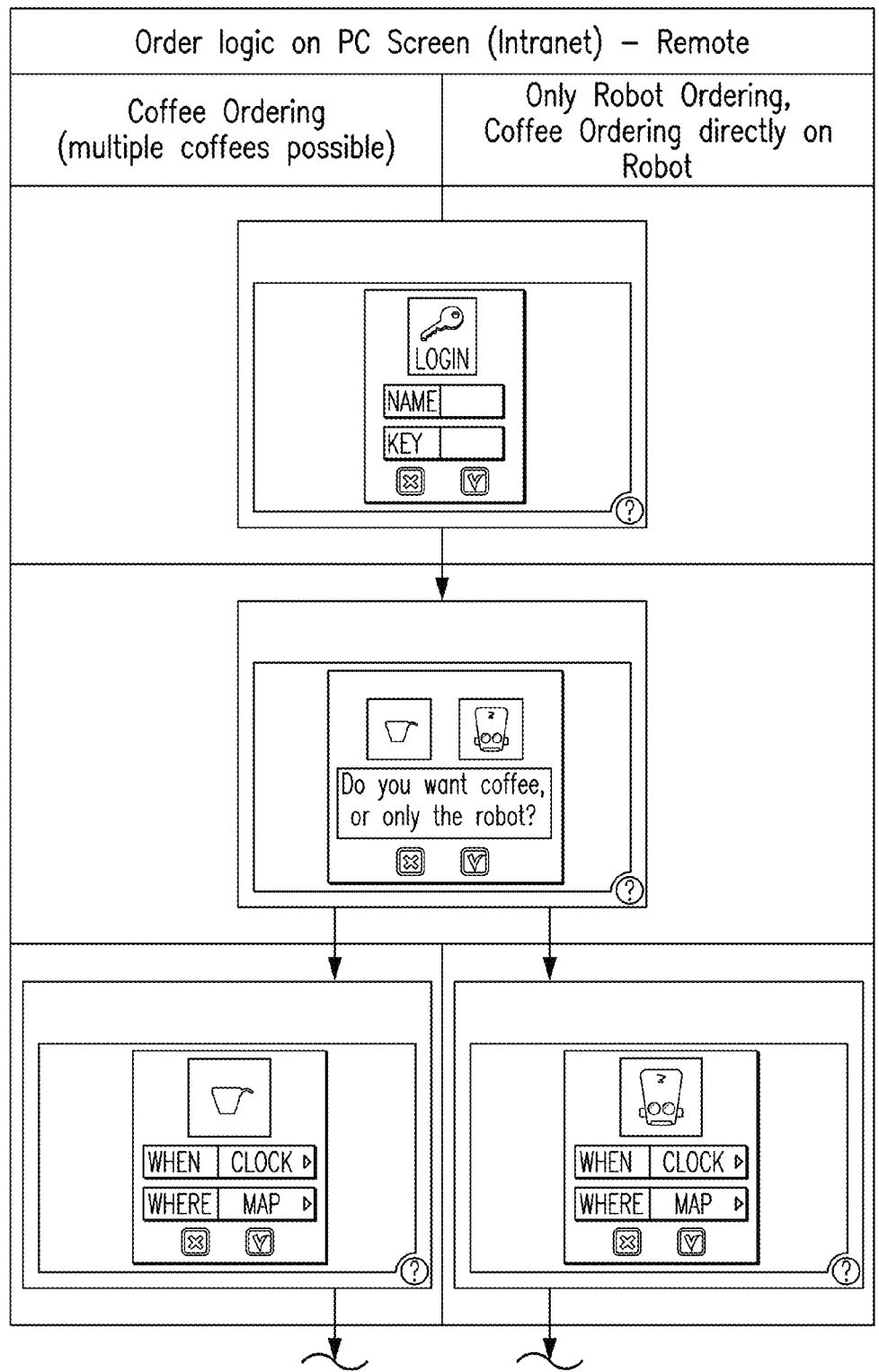
FIG. 17 illustrates the order logic.
Figures 2, 17:
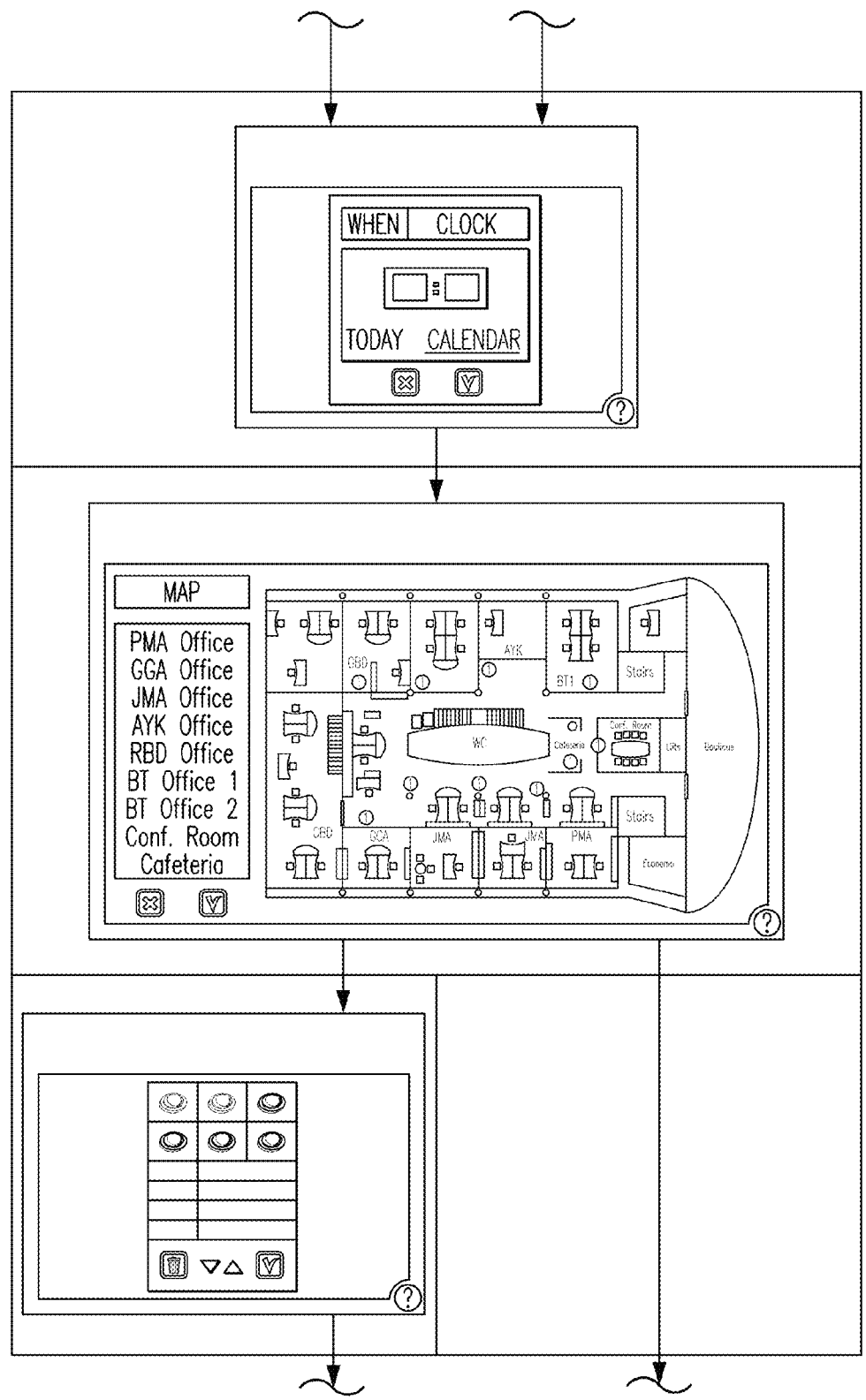
Figures 3, 17:
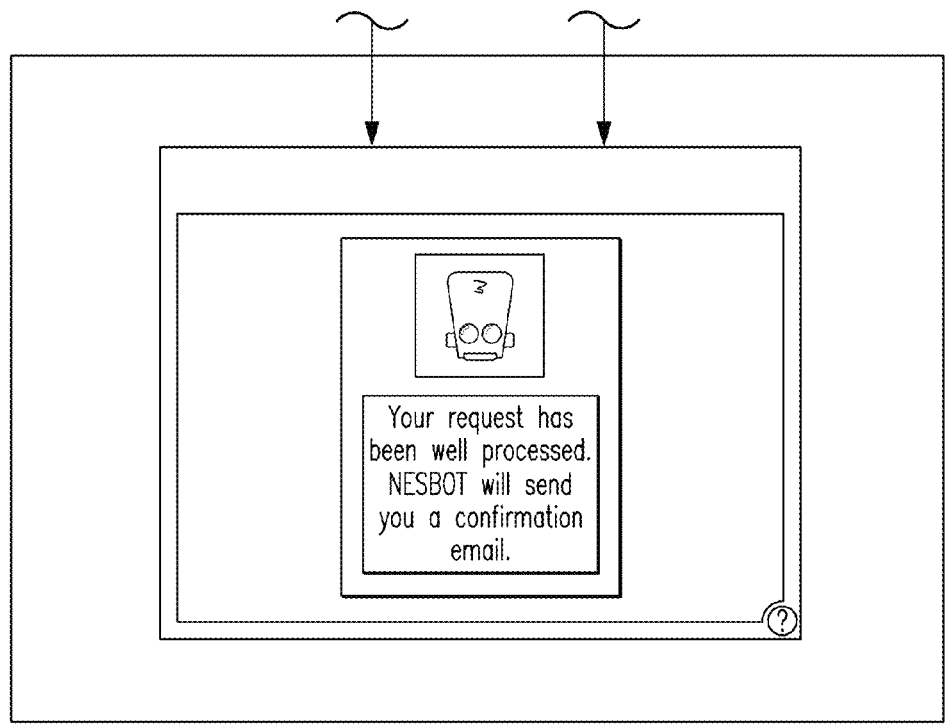
Figure 18:
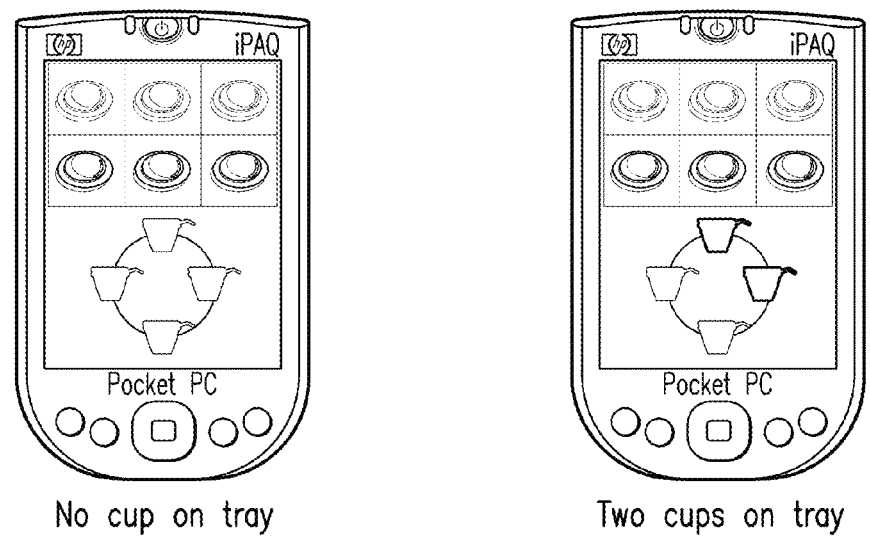
FIG. 18 shows a detachable user interface (pocket PC, personal digital assistant PDA etc.).
Figure 19:
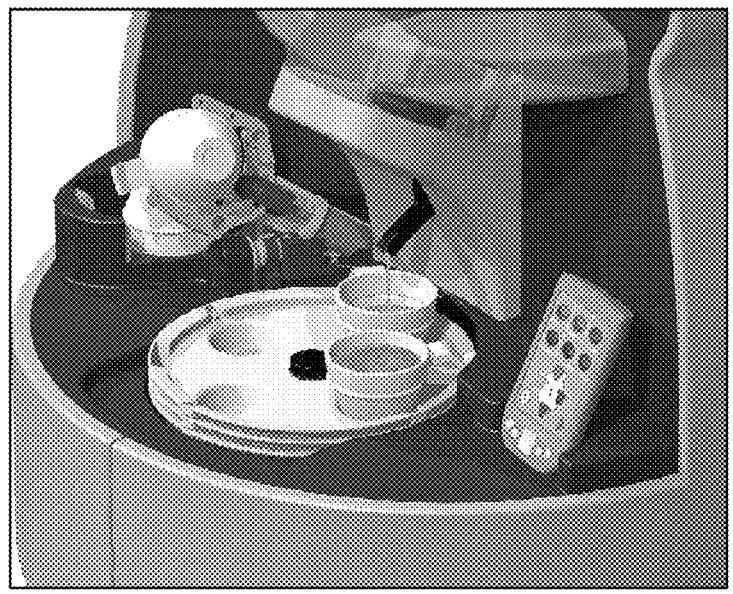
FIG. 19 shows the detachable user interface in a state connected to the robot.

The graphs of FIG. 17 explain a typical order placing on a Desktop PC, via a protected intranet network:

The web-based application firstly asks to choose either the blends you want or if you only want a visit of the robot. Finally, the user interface permits choosing the place and time to meet the robot. To this regard the graphical interface illustrates the environment e.g. by displaying a map. The user can then, using the map, specify a target location.

The user can specify the desired location where he/she wants the coffee to be produced. The user can choose, if he just wants the robot to move to the desired instructed location without preliminary coffee order, or he/she can order directly a cup of coffee, choosing the desired blend. Using the transmitted information on the desired position for the dispensing of the beverage, its current position and its navigation system, the robot will move autonomously to the desired place at the desired time (if any) and will start prepare coffee, if a coffee order has been placed. All this operations occur without external human influence.

If several people order a coffee at the same time, a queuing list is established by the robot like for a printer queue.

Several conflicts can be handled by implementing priority rules (e.g. conference rooms are served prior to individual orders)

Once all coffees at a defined place have been served, the robot continues to move either to the next order point or to a docking station for recharging.

The Pocket PC is placed on the Robot, in order to show the tray occupancy (which blend in which cup) and allows direct onboard coffee ordering, by simply clicking on the desired blend. After ordering, the robot immediately starts coffee preparation. As mentioned before, the Pocket PC can be removed from the robot in order to make coffee orders around a conference table (offboard coffee ordering).

Fully autonomous coffee machine, serving automatically coffee without external influence, except the order process.

The invention claimed is:

1. An autonomous mobile robotic device, having an active motion mechanism and comprising an integrated machine for producing beverages or liquid comestibles and having an onboard interface that allows the ordering of coffee on the robotic device using graphical presentation.

2. The device according to claim 1, comprising a controller for the production machine, the controller being connected to a wireless interface designed for receiving wirelessly transmitted signals to operate the production machine.

3. The device according to claim 1, wherein the onboard interface is manually operated, with the device comprising a controller for the production machine, the controller being connected to the manually operated user interface for setting operation of the production machine.

4. The device according to claim 3, wherein the user interface can be disconnected from the robot in order to enter parameters offboard.

5. The device according to claim 1, comprising an autonomous navigation system designed for navigating the robot based on output signals.

6. The device according to claim 5, wherein the output signals are obtained from visual sensors of the robot.

7. The device according to claim 1, wherein the production machine is self-containing.

8. The device according to claim 1, comprising an independent electrical power supply.

9. The device according to claim 1, wherein the user interface is a web based user interface for selecting a coffee blend, selecting a serving place, and selecting a serving time or date, using the graphical presentation.

10. An autonomous mobile robotic device, having an active motion mechanism and comprising an integrated machine for producing beverages or liquid comestibles, wherein the production machine produces the beverage or liquid comestible based on preportioned ingredients.

11. The device according to claim 10, wherein the device has a container for a stock of preportioned ingredients portions.

12. The device according to claim 10, further comprising an onboard interface for for allowing the ordering of a coffee directly on the robotic device, using graphical presentation.

13. An autonomous mobile robotic device, having an active motion mechanism and comprising an integrated machine for producing beverages or liquid comestibles, and an automatic cup and tray handling system.

14. The device according to claim 13, comprising a cup storage lift, a cup prehensor and a tray storage lift, able to stock several trays, whereas a cup can be transferred from the cup storage lift to the upper tray, in order to move the cup under the coffee outlet for coffee preparation.

15. An autonomous mobile robotic device having an active motion mechanism, comprising an integrated machine for producing beverages or liquid comestibles and a controller for the production machine,
    wherein the controller is connected to a manually operated user interface for setting operation of the production machine; and
    wherein the user interface can be disconnected from the robotic device in order to enter parameters offboard.

16. The device according to claim 15, wherein the user interface allows the ordering of a beverage directly on the robotic device, using graphical presentation.

17. The device according to claim 15, wherein the user interface includes a web-based user interface comprising the possibilities of selecting a coffee blend, selecting a serving place, and selecting a serving time or date, using graphical presentation, when the user interface is disconnected from the robotic device.

18. The device according to claim 15, comprising an autonomous navigation system designed for navigating the robotic device based on output signals.

19. The device according to claim 18, wherein the output signals are obtained from visual sensors of the robotic device.

20. The device according to claim 15, wherein the production machine is self-containing.

\* \* \* \* \*

UNITED STATES PATENT AND TRADEMARK OFFICE
CERTIFICATE OF CORRECTION

PATENT NO. : 8,509,947 B2  
APPLICATION NO. : 12/523254  
DATED : August 13, 2013  
INVENTOR(S) : Jarisch et al.

Page 1 of 1

It is certified that error appears in the above-identified patent and that said Letters Patent is hereby corrected as shown below:

In the Specification:

Column 1:
After the title and before the heading "FIELD OF THE INVENTION", insert the following paragraph:
-- This application is a 371 filing of International Patent Application PCT/EP2008/050478 filed Jan. 17, 2008. --.
After the heading "FIELD OF THE INVENTION", delete "This application is a 371 filing of International Patent Application PCT/EP2008/050478 filed Jan. 17, 2008.".

In the Claims:

Column 7:
Line 16 (claim 12, line 2), delete the second occurrence of the word "for".

Signed and Sealed this
Seventeenth Day of September, 2013

Teresa Stanek Rea
*Deputy Director of the United States Patent and Trademark Office*